(12) United States Patent
White et al.

(10) Patent No.: US 11,563,366 B1
(45) Date of Patent: Jan. 24, 2023

(54) ELECTROMAGNETICALLY-CONTROLLED MAGNETIC CYCLOIDAL GEAR ASSEMBLY AND METHOD OF OPERATING SAME

(71) Applicant: Kaney Aerospace, Inc., Rockford, IL (US)

(72) Inventors: Adam White, Beavercreek, OH (US); Waleed Said, Rockford, IL (US); Erik Michael Plugge, Rockford, IL (US)

(73) Assignee: Kaney Aerospace, Inc., Rockford, IL (US)

( * ) Notice: Subject to any disclaimer, the term of this patent is extended or adjusted under 35 U.S.C. 154(b) by 0 days.

(21) Appl. No.: 17/487,909

(22) Filed: Sep. 28, 2021

(51) Int. Cl.
  *H02K 49/10* (2006.01)
  *H02K 51/00* (2006.01)

(52) U.S. Cl.
  CPC .......... *H02K 49/102* (2013.01); *H02K 51/00* (2013.01); *H02K 49/104* (2013.01)

(58) Field of Classification Search
  CPC ...... H02K 49/00; H02K 49/10; H02K 49/102; H02K 49/104; H02K 51/00
  USPC .......................... 310/75 R, 96, 101, 103, 114
  See application file for complete search history.

(56) References Cited

U.S. PATENT DOCUMENTS

| | | | |
|---|---|---|---|
| 5,107,972 A * | 4/1992 | Sundquist | F16D 27/105 192/84.92 |
| 7,973,441 B2 | 7/2011 | Atallah | |
| 8,638,013 B2 * | 1/2014 | Takeuchi | H02K 29/08 310/83 |
| 10,612,638 B2 * | 4/2020 | Otsuka | H02K 7/116 |
| 10,784,762 B1 | 9/2020 | Grundmann et al. | |
| 10,807,337 B2 * | 10/2020 | Krieger | H02K 26/00 |
| 11,059,159 B2 * | 7/2021 | Puzio | B25F 5/00 |
| 2003/0070643 A1 * | 4/2003 | Watanabe | F01L 1/352 123/90.15 |
| 2003/0177992 A1 * | 9/2003 | Takenaka | F01L 1/34409 123/90.15 |
| 2008/0242465 A1 * | 10/2008 | Strobel | B62D 5/008 180/444 |
| 2008/0277386 A1 * | 11/2008 | Haimer | B23P 11/027 219/652 |
| 2010/0187954 A1 * | 7/2010 | Kendall | B60K 7/0007 310/67 R |

(Continued)

FOREIGN PATENT DOCUMENTS

WO 2017/058228 4/2017

*Primary Examiner* — Rashad H Johnson
(74) *Attorney, Agent, or Firm* — Amundsen Davis, LLC (57) ABSTRACT

The present disclosure to electromagnetically-controlled magnetic cycloidal gear assemblies and methods of operating same. In one example embodiment, such an assembly includes a stator that is concentric with respect to a primary axis of the assembly, and that includes a plurality of first magnetic devices, where each of those devices includes a respective electromagnet. Also, the assembly includes an input shaft that includes an offset cam, a cycloid mounted at least indirectly upon the offset cam, and an output hub. The cycloid is eccentric with respect to the primary axis and includes a plurality of second magnetic devices, and the output hub is at least indirectly rotationally coupled to the cycloid. The assembly also includes a controller coupled to each of the electromagnets by way of one or more linkages, and configured to govern at least one electric current that is passed through at least one of the electromagnets.

20 Claims, 8 Drawing Sheets

(56) References Cited

U.S. PATENT DOCUMENTS

| | | | | |
|---|---|---|---|---|
| 2010/0269770 | A1* | 10/2010 | Kokubo | H02K 7/14 |
| | | | | 310/68 B |
| 2014/0284183 | A1* | 9/2014 | Wolters | B65G 45/22 |
| | | | | 198/788 |
| 2014/0373795 | A1* | 12/2014 | Yamanaka | F01L 1/344 |
| | | | | 123/90.11 |
| 2017/0254400 | A1* | 9/2017 | Onitake | F16D 27/09 |
| 2019/0085906 | A1* | 3/2019 | Toda | F16H 49/001 |
| 2019/0136858 | A1* | 5/2019 | Walton | F01C 21/0809 |
| 2019/0242467 | A1* | 8/2019 | Han | F16H 29/04 |
| 2020/0173500 | A1* | 6/2020 | Yoder | B60K 17/3515 |
| 2020/0331337 | A1* | 10/2020 | Fliearman | B60K 6/547 |
| 2020/0332865 | A1* | 10/2020 | Fliearman | F16H 3/76 |
| 2020/0332866 | A1* | 10/2020 | Fliearman | F16H 63/304 |
| 2021/0031362 | A1* | 2/2021 | Zhang | B25J 9/102 |
| 2021/0199185 | A1* | 7/2021 | Ekonen | F16H 48/34 |
| 2021/0262531 | A1* | 8/2021 | Michishita | F16D 27/10 |
| 2022/0196123 | A1* | 6/2022 | Sugata | F16H 13/08 |

\* cited by examiner

ELECTROMAGNETICALLY-CONTROLLED MAGNETIC CYCLOIDAL GEAR ASSEMBLY AND METHOD OF OPERATING SAME

STATEMENT REGARDING FEDERALLY SPONSORED RESEARCH OR DEVELOPMENT

--

CROSS-REFERENCE TO RELATED APPLICATIONS

--

FIELD OF THE INVENTION

The present invention relates to gearboxes or gear assemblies or systems, and more particularly to magnetic cycloidal gearboxes or gear assemblies or systems, and methods of operating same.

BACKGROUND OF THE INVENTION

Gear assemblies are used in a wide variety of applications in order to transmit speed and torque from rotating power sources to other devices. Often, a gear assembly operates to communicate, for receipt by another device, output speed and output torque that are different from input speed and input torque that are received from a rotating power source. Various mechanical and magnetic gear assemblies are known. One type of known magnetic gear assembly is the magnetic cycloidal gear assembly.

The general principle of a magnetic cycloidal gear assembly can be understood to involve two circular structures of unequal size, with the larger circular structure being stationary, and with the smaller circular structure being positioned within the interior of the larger circular structure and arranged to be tangent (or substantially tangent) to an interior circular edge of the larger circular structure. Given such an arrangement, the smaller circular structure can be configured to rotate within the inside of the larger circular structure, along the interior circular edge, in an eccentric manner. Such rotational motion can be exploited for gearing when the outer, larger circular structure is a stator and the inner, smaller circular structure is a rotor.

Figure 1:
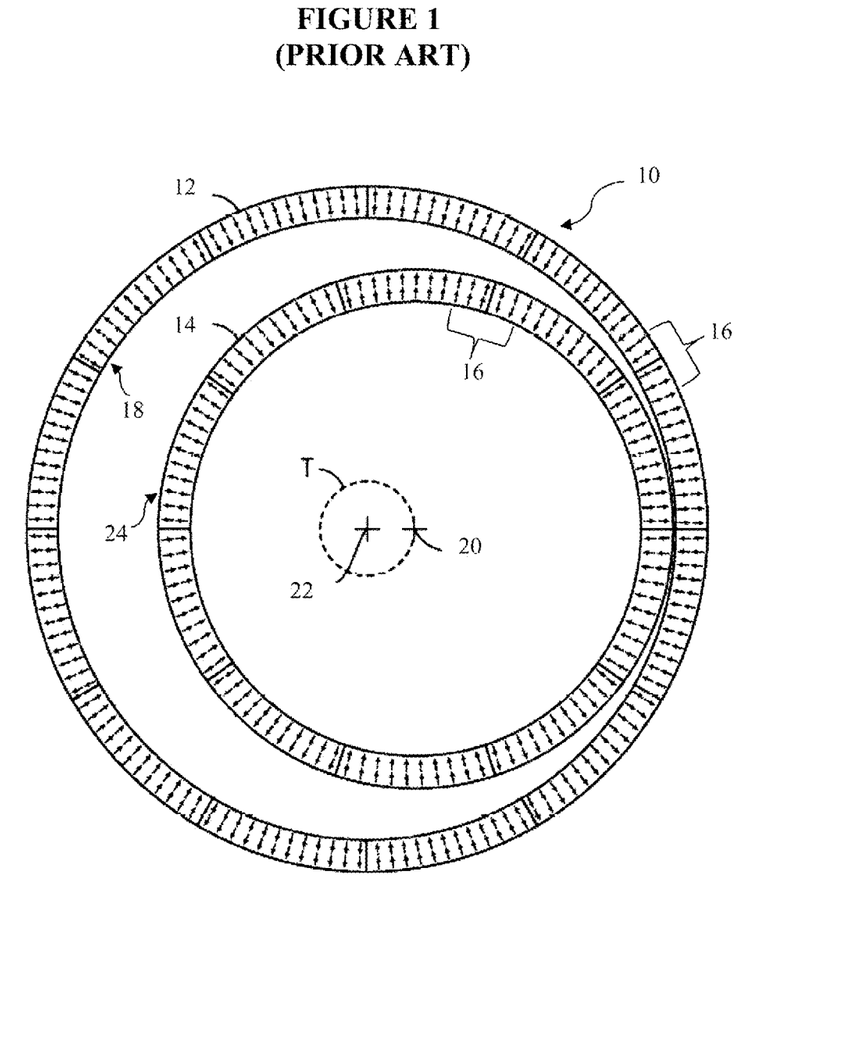
FIG. 1 is a Prior Art schematic, front elevation view of a conventional magnetic cycloid gear as can be employed in a conventional magnetic cycloidal gear assembly.

More particularly, FIG. 1 is a schematic, front elevation view of a conventional magnetic cycloid gear 10, having a stator 12 and a rotor 14. The stator 12 and rotor 14 are positioned in an eccentric (or non-concentric) manner, such that a rotor axis 20 is displaced with respect to and not aligned with a stator axis 22. An input drive shaft (not shown) that drives the rotor 14 has a central axis that is aligned with the stator axis 22, such that the rotor axis 20 also is displaced with respect to the central axis of the input drive shaft. Although the rotor axis 20 is displaced from the central axis of the input drive shaft, the input drive shaft nevertheless is engaged with the rotor 14 in a manner (e.g., by way of a cam) such that rotation of the input drive shaft causes corresponding rotation of the rotor axis 20 about the stator axis 22, such that the rotor axis 20 follows a trajectory T (shown in the dashed lines).

Although rotation of the input drive shaft causes rotation of the rotor axis 20 about the stator axis 22 that occurs at the same rotational frequency as the rotation of the input drive shaft itself, this is not to say that the entire rotor 14 rotates at that rotational frequency. Rather, magnetic pole pairs 16 are arrayed on the stator 12 and rotor 14, and magnetic interactions between those of the magnetic pole pairs of the stator 12 and rotor 14 that are closest together depending upon the relative positioning of the stator and rotor at any given time, prevent relative "slipping" motion between the stator and rotor. Consequently, as governed by the interaction of the magnetic pole pairs 16, rotation of the input drive shaft causes an outer circular edge 24 of the rotor 14 to "roll along" an inner circular edge 18 of the stator 12 (with those edges only being separated by an air gap), in an eccentric manner determined by the rotation of the rotor axis 20 about the stator axis 22.

The amount of rotation that is experienced by the rotor 14 relative to the stator 12 (as the outer circular edge 24 of the rotor rolls along the inner circular edge 18 of the stator) is determined by the difference in the number of pole pairs arranged along the inner circular edge of the stator relative to the number of pole pairs arranged along the outer circular edge of the rotor. In general, because the stator 12 has more pole pairs along the inner circular edge 18 than the rotor 14 has along the outer circular edge 24, the rotor 14 will rotate more than a full revolution for every revolution it travels around the stator 12. The gear ratio is based on the number of pole pairs arrayed on the stator as compared to the number of pole pairs arrayed on the rotor. For example, if the stator has m+1 pole pairs, and the rotor has m pole pairs, then the gear ratio between the two is −1/m. In the embodiment of FIG. 1, the gear ratio also effectively corresponds to the difference in the circumferences between the inner circular edge 18 and the outer circular edge 24 because magnets of the same size are employed on each of the stator 12 and the rotor 14. However, this is not fundamental and, in other embodiments (e.g., embodiments in which the magnets employed on the stator are sized differently than the magnets employed on the rotor), the gear ratio need not correspond particularly to the difference in the circumferences between the inner circular edge of the stator and the outer circular edge of the rotor.

In a magnetic cycloidal gear assembly, the rotor 14 is mounted on (or is formed by) a cycloidal disk. Although not shown in FIG. 1, it should be appreciated that the cycloidal disk, in addition to being mounted eccentrically on the input shaft as described above, is also typically coupled to an output structure. The output structure serves to output rotational power from the magnetic cycloidal gear assembly. The output rotational torque and speed provided by the output structure typically differ respectively from the input rotational torque and speed (received via the input shaft) in accordance with the gear ratio established by the pole pairs 16 of the rotor 14 and the stator 12.

Notwithstanding the existence of conventional magnetic cycloidal gear assemblies, such conventional magnetic cycloidal gear assemblies face certain challenges and concerns. Magnetic cycloidal gears assemblies often require large external diameters to achieve the same torque carrying capacity of equivalent mechanical gears (spur, planetary etc.). As such, to act as a direct replacement for mechanical gearboxes in actuation systems, space accommodations must be made, such as increasing the physical envelope or removing other features. Although such accommodations may be possible, such accommodations can involve tradeoffs that result in the loss of features or functions that are desirable.

For example, in the Integrated Servo Actuator and Controller (ISAAC) available from Kaney Aerospace, Inc. of Rockford, Ill., the disengage clutch has been removed to accommodate the magnetic gearbox. Yet removal of the disengage clutch is not preferable. If the disengage clutch were present, the disengage clutch would allow the actuator output to fully disengage and freewheel in certain operational circumstances, such as in the case of a manual override. Additionally, although the magnetic cycloidal gearbox can be back-driven when the motor is unpowered, the back-drive torque is significantly higher than the freewheel torque that would arise during freewheeling if the disengage clutch were present. This correspondingly can increase the likelihood that the actuator may jam in a manner that is not easily overridden through manual intervention or by way of a parallel actuator, which may be undesirable in some aerospace applications.

For at least one or more of these reasons, or one or more other reasons, it would be advantageous if new or improved magnetic cycloidal gear assemblies or systems could be developed, and/or improved methods of operation of such assemblies or systems could be developed, so as to address any one or more of the concerns discussed above or to address one or more other concerns or provide one or more benefits.

SUMMARY

In at least one example embodiment, the present disclosure relates to an electromagnetically-controlled magnetic cycloidal gear assembly. The magnetic cycloidal gear assembly includes a stator that is fixed and concentric with respect to a primary axis of the magnetic cycloidal gear assembly, and that includes a plurality of first magnetic devices, and also includes an input shaft that is configured to rotate about the primary axis and that includes an offset cam that is offset with respect to the primary axis. Additionally, the magnetic cycloidal gear assembly also includes a cycloid mounted at least indirectly upon the offset cam and configured to rotate both relative to the offset cam and also within the stator, where the cycloid is eccentric with respect to the primary axis and includes a plurality of second magnetic devices. Further, the magnetic cycloidal gear assembly additionally includes an output hub that is concentric with the primary axis and includes a plurality of cam follower receivers, and a plurality of cam followers, each cam follower having a respective first end and a respective second end, where the respective first end of each cam follower is received within a respective one of the cam follower receivers and the respective second end of each cam follower is coupled to the cycloid at a respective location on the cycloid. Additionally, either each of the first magnetic devices or each of the second magnetic devices includes a respective electromagnet configured to produce a respective magnetic field in accordance with a respective current passing therethrough.

Further, in at least one example embodiment, the present disclosure relates to an electromagnetically-controlled magnetic cycloidal gear assembly. The magnetic cycloidal gear assembly includes a stator that is fixed and concentric with respect to a primary axis of the magnetic cycloidal gear assembly, and that includes a plurality of first magnetic devices, where each of the first magnetic devices includes a respective electromagnet. Also, the magnetic cycloidal gear assembly includes an input shaft that is configured to rotate about the primary axis and that includes an offset cam that is offset with respect to the primary axis. Further, the magnetic cycloidal gear assembly additionally includes a cycloid mounted at least indirectly upon the offset cam and configured to rotate both relative to the offset cam and also within the stator, where the cycloid is eccentric with respect to the primary axis and includes a plurality of second magnetic devices, and where each of the second magnetic devices includes a respective permanent magnet. Additionally, the magnetic cycloidal gear assembly also includes an output hub that is concentric with the primary axis and includes a plurality of cam follower receivers, where the output hub is at least indirectly rotationally coupled to the cycloid by way of a plurality of cam followers that are coupled to the cycloid and that respectively interface the cam follower receivers. Further, the magnetic cycloidal gear assembly additionally includes a controller coupled to each of the electromagnets by way of one or more linkages, where the controller is configured to govern at least one electric current that is passed through at least one of the electromagnets so as to produce a magnetic field.

Additionally, in at least one example embodiment, the present disclosure relates to a method of operating a electromagnetically-controlled magnetic cycloidal gear assembly. The method includes providing a stator that is fixed and concentric with respect to a primary axis of the magnetic cycloidal gear assembly, and that includes a plurality of first magnetic devices, where each of the first magnetic devices includes a respective electromagnet. Also, the method includes causing, at least indirectly by way of a controller, at least one current to flow through the respective electromagnets of the first magnetic devices so as to generate a magnetic field. Additionally, the method includes receiving input rotational power at an input shaft having an offset cam about the primary axis, where the offset cam is offset with respect to the primary axis. Further, the method includes, in response to the receiving of the input rotational power, eccentrically rotating a cycloid that is mounted at least indirectly upon the offset cam within the stator, where the cycloid is eccentric with respect to the primary axis and includes a plurality of second magnetic devices, and where each of the second magnetic devices includes a respective permanent magnet. The cycloid eccentrically rotates at least in part due to interactions between the first magnetic devices and the second magnetic devices. Additionally, the method also includes communicating at least one first portion of the input rotational power from the cycloid to an output hub that is concentric with the primary axis and includes a plurality of cam follower receivers, by way of a plurality of cam followers that are coupled to the cycloid and that interface the cam follower receivers, and outputting the at least one first portion of the input rotational power as output rotational power from the output hub.

Notwithstanding the above examples, the present invention is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of assembly or arrangements of components, or orderings of process steps, illustrated in the drawings. The disclosure is capable of other embodiments or of being practiced or carried out in other various manners. In the drawings, like parts are labeled with like reference numbers. In the drawings.

DETAILED DESCRIPTION

The present disclosure relates to embodiments of magnetic cycloid gear assemblies or systems, which can also be referred to as magnetic gearboxes, that employ electromagnets in place of at least some permanent magnets that might otherwise be employed in conventional magnetic gearboxes. In at least some such embodiments encompassed herein, the electromagnets are positioned on or as part of the stator in place of permanent magnets that conventionally might be employed on the stator. The electromagnets can be powered or unpowered as needed or depending upon the circumstance. Given this to be the case, the magnetic cycloid gear assembly or system operates as an electromagnetically-controlled (or powered) magnetic gearbox that both can operate as a conventional magnetic gearbox when powered, and also can "disengage" to allow freewheeling of the output when necessary.

Magnetic cycloidal gear assemblies as disclosed or encompassed herein can be used in a wide variety of applications. For example, in some embodiments, such magnetic cycloidal gear assemblies can be incorporated into servo actuators. In at least one example, servo actuators including such magnetic cycloidal gear assemblies of the present technology can be used for aerospace applications such as flight surface control applications. Further, magnetic cycloid gear assemblies of the present technology can be made with various gear ratios, and can have various rotations per minute, depending upon the application or desired level of power output. Although the present disclosure particularly envisions the application or implementation of electromagnets with respect to magnetic cycloidal gear assemblies or systems (or gearboxes), the present disclosure also encompasses embodiments in which electromagnets are applied to other topologies (e.g., other gearbox or transmission topologies) as well.

Figure 2:
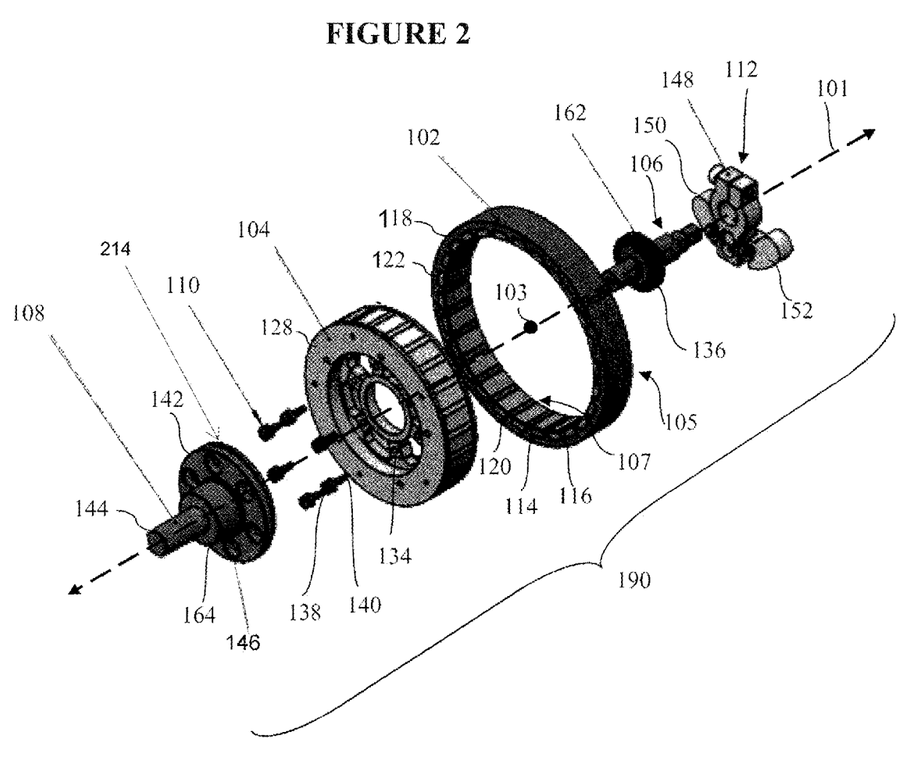
FIG. 2 is an exploded view of portions of one example of a magnetic cycloidal gear assembly that employs electromagnets in accordance with the present technology.
Figure 3:
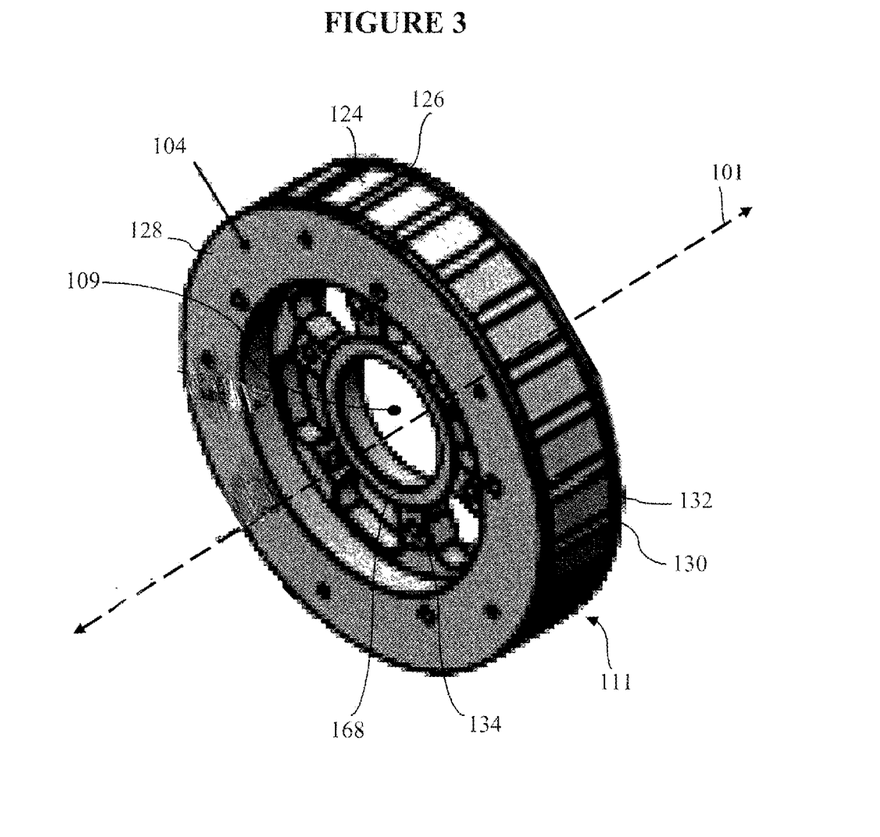
FIG. 3 is an enlarged view of one of the portions shown in FIG. 2, namely, a cycloid.
Figure 4:
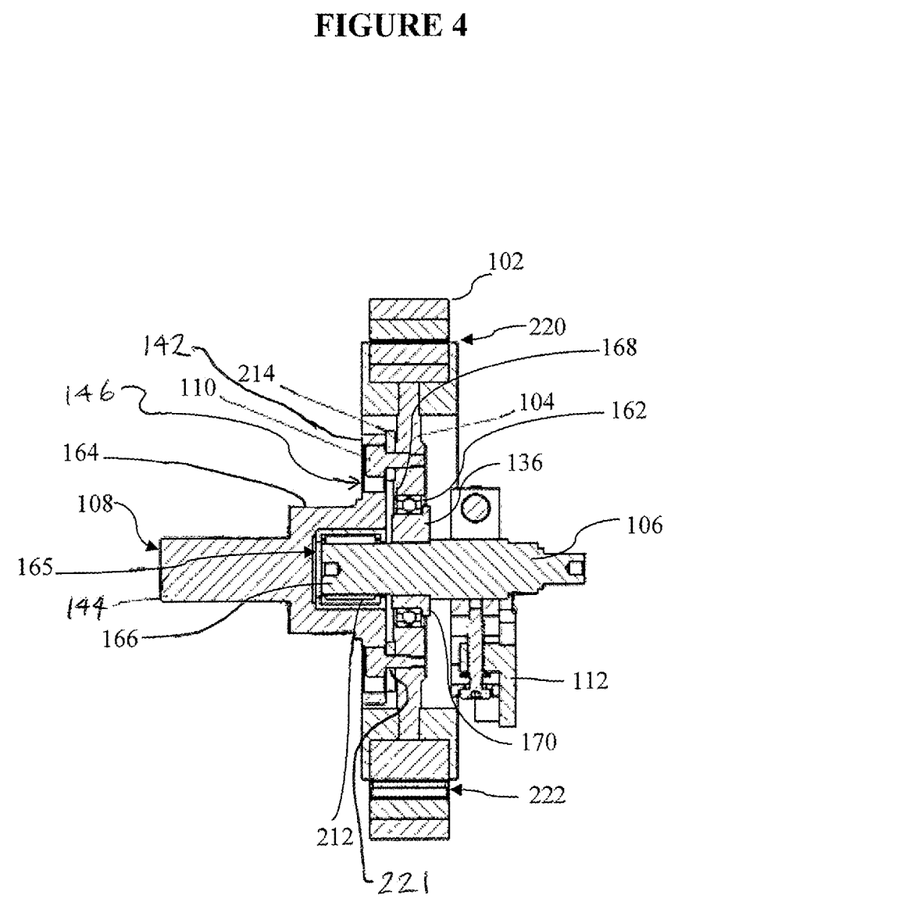
FIG. 4 is a cross-sectional view of the portions of the magnetic cycloidal gear assembly shown in FIGS. 2 and 4, when the portions of the magnetic cycloidal gear assembly are fully assembled (rather than exploded) and have first rotational positions about a central axis corresponding to the positions shown in FIG. 2.

One example of a magnetic cycloidal gear assembly 100 that includes electromagnets in accordance with the present technology is shown in FIGS. 2, 3, 4, 5, and 6. The magnetic cycloidal gear assembly 100 is shown, in its entirety, in FIGS. 5 and 6, which (among other aspects) illustrate schematically a controller 250 that serves to govern the providing of power to the electromagnets of the magnetic cycloidal gear assembly, along with associated power/control linkages 252. By contrast, FIGS. 2 and 4 show portions 190 of the magnetic cycloidal gear assembly 100 that omit the controller 250 and associated power/control linkages 252, and FIG. 3 particularly shows a cycloid 104 of that gear assembly. FIG. 4 particularly provides a cross-sectional view of the portions 190 of the magnetic cycloidal gear assembly 100 when those portions are fully assembled. The particular cross-sectional view provided in FIG. 4 is taken along a plane that passes through a schematic primary axis 101 of the magnetic cycloidal gear assembly 100.

As shown in FIGS. 2 and 4, the magnetic cycloidal gear assembly 100 includes a stator 102, a cycloid 104, an input shaft 106, an output hub 108, a bushing 214, a plurality of cam followers 110, and a counterweight 112. The stator 102 is fixed and concentric with respect to the schematic primary axis 101 of the magnetic cycloidal gear assembly 100, such that the schematic primary axis 101 intersects a center point 103 of the stator 102 when the magnetic cycloidal gear assembly 100 is assembled and mounted. The stator 102 is generally annular in shape and has an outer cylindrical surface 105 and an inner cylindrical surface 107. In the present example, the stator 102 includes a back-iron cylinder 118 having an outer rim that constitute the outer cylindrical surface 105, and additionally a plurality of teeth (e.g., m teeth) 120 that each protrude radially inwardly from the back-iron cylinder towards the center point 103 of the stator 102.

The stator 102 also has a number of (e.g., m) electromagnets 122, with each of the electromagnets being mounted between a respective pair of the teeth 120 and facing inwardly towards the center point 103 of the stator 102. Innermost surfaces of the teeth 120 and of the electromagnets 122 together form the inner cylindrical surface 107 of the stator 102. Each of the electromagnets 122 has a respective inner surface along the inner cylindrical surface 107 and can be powered so that the respective inner surface constitutes a respective positive pole 114. When the electromagnets 122 are powered to provide the positive poles 114 (along the inner surfaces of those electromagnets), then each of the teeth 120 is a respective negative pole 116. In this regard, the respective teeth 120 also can be considered respective consequent poles by comparison with the positive poles 114 provided by the respective electromagnets 122.

With such arrangement, the stator 102 can be understood to include a first number of electromagnetically-generated pole pairs, such as m (or alternatively m+1) magnetic pole pairs, with each magnetic pole pair having a respective one of the positive poles 114 and a respective one of the negative poles 116. Although in this arrangement, it is particularly the positive poles 114 that are provided by the electromagnets (or windings or coils) 122, with the negative poles 116 being provided by way of the teeth 120 as consequent poles, this need not be the case in other embodiments. In particular, in some alternate embodiments, electromagnets (or windings or coils) are employed for both the positive and negative poles—that is, certain ones of the electromagnets (or windings or coils) serve as the positive poles while other ones of the electromagnets (or windings or coils) serve as the negative poles.

Referring additionally to FIG. 3, the cycloid 104 serves as a rotor that is configured to rotate within the stator 102 during operation of the magnetic cycloidal gear assembly 100. The cycloid 104 is mounted eccentrically with respect to the schematic primary axis 101 of the magnetic cycloidal gear assembly 100, such that the schematic primary axis 101 does not intersect a center point (or center axis) 109 of the cycloid 104 when the magnetic cycloidal gear assembly 100 is assembled and mounted. The cycloid 104 can be mounted onto the input shaft 106 by a rolling element bearing 162 on an offset cam 136 (see FIGS. 2 and 4). The rolling element bearing 162 can be, in an example embodiment, a radial bearing. An outer cylindrical surface 111 of the cycloid 104 particularly is the surface that effectively rolls around the inner cylindrical surface 107 of the stator 102 (except insofar as an air gap separates the two surfaces) when the cycloid rotates during operation of the magnetic cycloidal gear assembly 100.

Further as shown in FIG. 3, the cycloid 104 has a second number of magnetic pole pairs, such as n (or alternatively m) magnetic pole pairs, with each magnetic pole pair having a respective negative pole 124 and a respective positive pole 126. Because the cycloid 104 is configured to fit and rotate within the stator 102 during operation as the rotor of the magnetic cycloidal gear assembly 100, the number of magnetic pole pairs n of the cycloid is less than the number of magnetic pole pairs m of the stator 102. Depending upon the embodiment, the number of magnetic pole pairs n of the cycloid 104 can be less than the number of magnetic pole pairs m of the stator 102 by at least one magnetic pole pair, or by more than one magnetic pole pair.

In the present example embodiment, the cycloid 104 includes a back-iron cylinder (or disk) 128 having a plurality of (e.g., n) teeth 130, and additionally includes a number of (e.g., n) permanent magnets 132, with each of the permanent magnets being mounted between a respective pair of the teeth. The permanent magnets 132 of the cycloid 104 are arranged to each face outwardly away from the center point 109, and also each of the teeth 130 extends radially outwardly from the back-iron cylinder 128, so as to extend in between a respective pair of the permanent magnets 132. Given this arrangement, it can be seen that the outer cylindrical surface 111 of the cycloid 104 is formed by the radially-outermost surfaces of the permanent magnets 132 and teeth 130. The polarities of the teeth 130 and permanent magnets 132 are opposite those of the teeth 120 and electromagnets 122 of the stator 102 when the electromagnets are powered. That is, each of the permanent magnets 132 of the cycloid 104 is a respective one of the negative poles 124, and each of the teeth 130 is a respective one of the positive poles 126. The respective teeth 130 also can be considered respective consequent poles by comparison with the respective permanent magnets 132.

Notwithstanding the above discussion, the stator 102 in other embodiments can have any other suitable arrangement that provides magnetic pole pairs. For example, a Halbach array or series of Halbach arrays can be used in place of the back-iron of the stator 102. Also, the electromagnets 122 on the stator 102 can be arranged to serve as negative poles (in terms of the polarity of the electromagnets along the inner cylindrical surface 107), and the teeth 120 in between those permanent magnets can serve as positive poles. Likewise, in other embodiments the cycloid 104 (or rotor) can have any other suitable arrangement that provides magnetic pole pairs. Again for example, a Halbach array or series of Halbach arrays can be used in place of the back-iron of the cycloid 104. Additionally, the permanent magnets 132 on the cycloid can be arranged to serve as positive poles (in terms of the polarity of the permanent magnets along the outer cylindrical surface 111), and the teeth 130 can serve as negative poles. Also, different permanent magnets can be employed both to serve as positive poles and also to serve as negative poles on the cycloid.

Further, although in the present embodiment it is the stator 102 that includes the electromagnets 122 and the cycloid 104 that includes the permanent magnets 132, in alternate embodiments encompassed herein it is the cycloid that includes electromagnets and the stator that includes permanent magnets. Additionally, in some further alternate embodiments, each of the stator and the cycloid includes electromagnets. In some such embodiments, the electromagnets of the stator can have one polarity (e.g., a positive polarity, or alternatively a negative polarity) and the electromagnets of the cycloid can have the opposite polarity (e.g., a negative polarity, or alternatively a positive polarity). Also, in some alternate embodiments, one or both of the stator and the cycloid include a combination of one or more electromagnets and one or more permanent magnets.

In the present embodiment, the cycloid 104 is caused to rotate as a result of rotation of the input shaft 106. As shown in FIG. 2, the input shaft 106 includes the offset cam 136, which is positioned within and supports the cycloid 104 by way of the rolling element bearing 162. In general, the input shaft 106 is concentric with respect to the schematic primary axis 101 of the magnetic cycloidal gear assembly 100. However, the offset cam 136 is offset with respect to the schematic primary axis 101 of the magnetic cycloidal gear assembly 100, with one side of the offset cam 136 extending outwardly from the input shaft 106 farther than the other side of the offset cam. In the present example embodiment, in which the offset cam 136 is circular, the offset cam 136 is concentric with the cycloid 104.

As shown in FIG. 4, the cycloid 104 can include a cycloid lip (or shoulder) 168, and can be mounted on the rolling element bearing 162 in part by way of the cycloid lip 168. As illustrated, the cycloid lip particularly extends radially inwardly along a side portion of the rolling element bearing 162, along the side of the rolling element bearing that is closer to (rather than farther from) the output hub 108. Further, the offset cam 136 includes an offset cam shoulder 170 that extends radially outward from the remainder of the offset cam alongside the rolling element bearing 162, on the side of the rolling element bearing that is farther from (rather than closer to) the output hub 108.

In addition to being caused to rotate as a result of rotation of the input shaft 106, the cycloid 104 and magnetic cycloidal gear assembly 100 more generally are configured so that rotation of the cycloid additionally causes rotation of the output hub 108. In this regard, the cycloid 104 includes a plurality of cam follower retainers 134, each of which is configured to receive a respective one of the cam followers 110. Each of the plurality of cam followers 110 has a first end 138 and a second end 140. The second end 140 of each of the plurality of cam followers 110 is retained by a respective one of the cam follower retainers 134, and is thus fixed to the cycloid 104. Further, the output hub 108 presses against the bushing 214, which can be an oil impregnated bushing, and the bushing can also press against the cycloid 104. The bushing 214 can include a plurality of bores 221 (see FIG. 4), and each of the plurality of cam followers 110 can pass through a respective one of the bores 221. The plurality of cam followers 110 can thus connect the bushing 214 to the cycloid 104.

It should be appreciated that the exact arrangement of the bushing 214, cam followers 110, and cam follower retainers 134 can vary depending upon the embodiment. For example, any suitable number of the cam follower retainers 134 and any suitable number of the bores 221 can be included, preferably at least two of each, or more than two of each, such as three, four, five, or more than five. For example, in the present embodiment, six of the cam follower retainers 134 and six of the bores 221 are present in the cycloid 104 and the bushing 214, respectively. Likewise, any suitable number of the cam followers 110 can be included in the magnetic cycloidal gear assembly 100. Accordingly, at least two of the cam followers 110 can be provided, or more than two, such as three, four, five, or more than five. For example, in the present embodiment, six of the cam followers 110 are present. Preferably a respective one of the cam followers 110 is provided for each of cam follower retainers 134 of the cycloid 104.

The cam followers 110 particularly allow for rotational motion of the cycloid 104 to be communicated to the output hub 108, which is concentric with the schematic primary axis 101 of the magnetic cycloidal gear assembly 100. The output hub 108 includes an output disk 142, an output shaft 144, and an intermediate portion 164 positioned between the output shaft and output disk and having a diameter that is larger than that of the output shaft. The output shaft 144 is concentric with the schematic primary axis 101, can be connected to another device, and can be used to transmit the speed and torque output (or generated) by the magnetic cycloidal gear assembly 100 to another device (not shown). The output disk 142 includes a plurality of cam follower receivers 146. Each of the cam follower receivers 146 has a receiver radius (or diameter) that is larger than a first end radius (or diameter) of each of the first ends 138 of each of the cam followers 110. By virtue of this difference in size of the receiver radius and first end radius, the respective first end 138 of each of the cam followers 110 can rotate eccentrically within the respective one of the cam follower receivers 146 in which that first end is positioned, even though the output hub 108 and cam follower receivers 146 thereof do not vary in their radial positioning relative to the schematic primary axis 101.

From the above discussion, it should be appreciated that the output hub 108 is interactively connected to the cycloid 104 by the cam followers 110, and the cam followers 110 transmit output torque and rotation from the cycloid 104 to the output hub. That is, as the cycloid 104 rotates relative to the stator 102, rotational power is transferred from the cycloid 104 to the output hub 108 by way of the plurality of cam followers 110 and their interactions with the cam follower receivers 146. The use of the plurality of cam followers 110 can eliminate the need for rolling pin elements, and can significantly reduce the rolling resistance and therefore improve the efficiency of the magnetic cycloidal gear assembly 100 as compared to some conventional magnetic cycloidal gear assemblies. Additionally, oil (or other lubricant) can be delivered to the bores 221, and thereby to the cam followers 110, the cam follower receivers 146, and the interface between output hub 108 and the bushing 218 to facilitate relative movement of these component parts (and especially any sliding movement of the bushing relative to the output hub).

In some embodiments, also encompassed herein, each of the cam followers 110 can include a respective roller bearing (or similar rolling head or wheel feature) at the respective first end 138 of the respective cam follower, as a respective head of the respective cam follower. With such an arrangement, movement of the cam followers 110 within the cam follower receivers 146 entails rotational motion of the roller bearings relative to the remaining portions of the cam followers (e.g., the second ends 140), and sliding motion (and consequent friction) of the cam followers relative to the cam follower receivers is lessened or avoided. Also, in some embodiments encompassed herein, a set of rolling element bearings that are fixed to the cycloid 104 operate to transmit torque from the cycloid to the output hub 108.

FIG. 4 additionally illustrates how the input shaft 106 and output hub 108 are supported relative to one another. In the present embodiment, an input shaft receiver 165 (which defines an input shaft receiving orifice) is provided within the output hub 108 and particularly extends inwardly from the end surface of the output disk 142 and into the intermediate portion 164, toward (but not up to) the output shaft 144. The input shaft receiver 165 is configured to receive a first end 166 of the input shaft 106 as well as an input shaft bearing 212. More particularly, the input shaft bearing 212 can be inserted into the input shaft receiver 165, and the first end 166 of the input shaft 106 can be inserted into the input shaft bearing. The input shaft bearing 212 can be a roller bearing, and can prevent radial movement of the input shaft 106 while allowing the input shaft 106 to rotate within the input shaft receiver 165. Therefore, the input shaft 106 (at least the first end 166 of the input shaft) is rotatably supported upon and within the output hub 108 by way of the input shaft bearing 212.

As for the counterweight 112, as shown in FIGS. 2 and 4, the counterweight is attached to the input shaft 106. The counterweight 112 can have a clamp 148, a first lobe 150 and a second lobe 152. The clamp 148 can attach the counterweight 112 to the input shaft 106 such that the counterweight 112 can rotate with the input shaft 106. The counterweight 112 can balance out the mass imbalance caused by the rotation of the eccentrically mounted cycloid 104.

Figure 5:
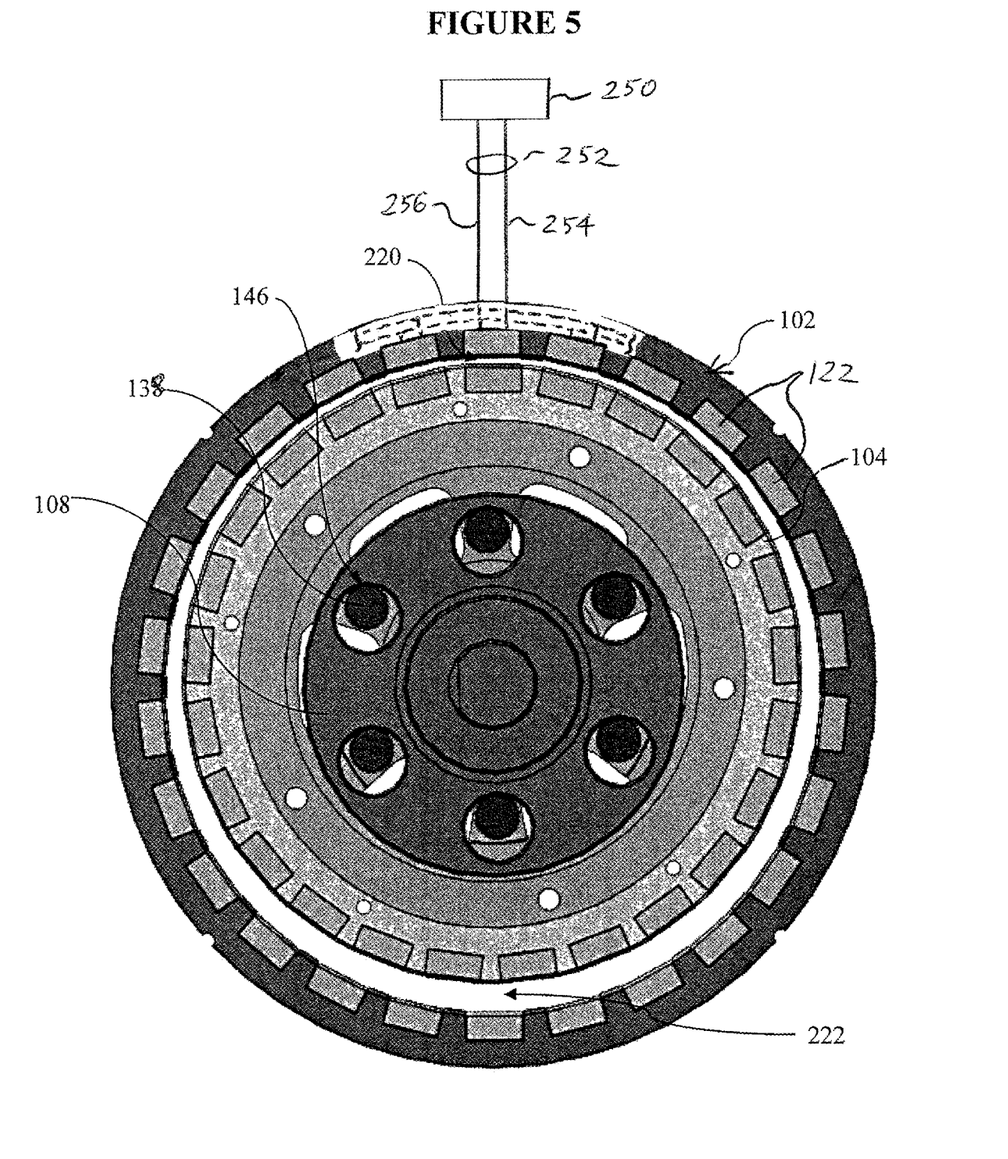
FIG. 5 is a front elevation view of the magnetic cycloidal gear assembly of FIGS. 2, 3, and 4, in which the portions shown in FIGS. 2 and 4 have the same first rotational positions as in FIG. 4, and which also shows schematically a controller for governing actuation of the electromagnets of the assembly, along with associated power/control linkages.
Figure 6:
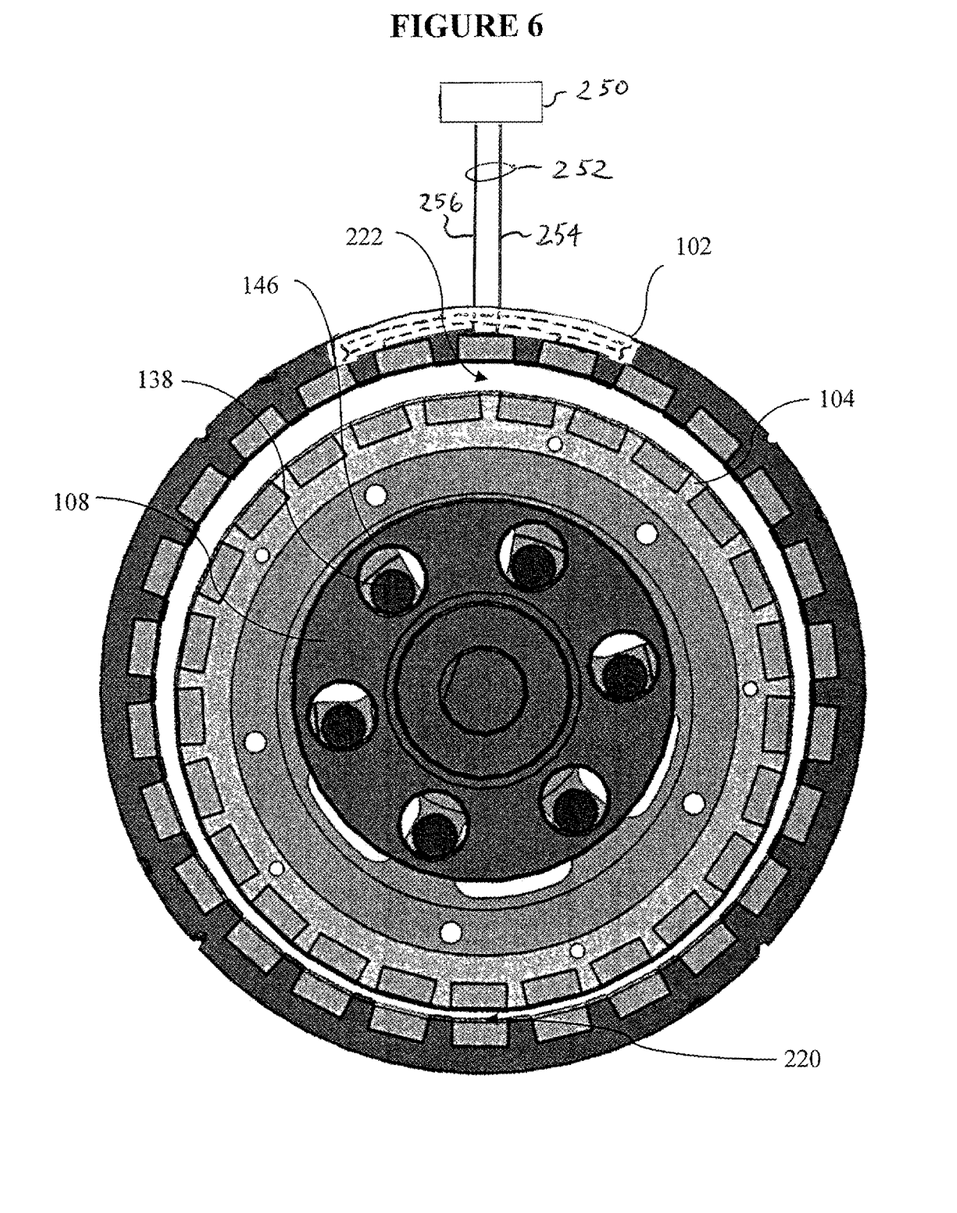
FIG. 6 is a front elevation view of the magnetic cycloidal gear assembly of FIGS. 2, 3, 4, and 5, in which several of the portions shown in FIGS. 2 and 4 have second rotational positions differing from those of FIGS. 4 and 5, and which again shows the controller and associated power/control linkages of FIG. 5.

Referring additionally to FIGS. 5 and 6, front elevation views are provided to illustrate the magnetic cycloidal gear assembly 100 at different times during operation, at which the cycloid 104 has two different positions relative to the stator 102. FIG. 5 particularly provides a front elevation view of the magnetic cycloidal gear assembly 100 when the cycloid 104 is in a first position, which corresponds to what is shown in FIG. 4 (in terms of the rotational orientation of the cycloid 104 about the schematic primary axis 101). By contrast, FIG. 6 provides a front elevation view of the magnetic cycloidal gear assembly 100 when the cycloid 104 is in a different, second position. Thus, the relative rotation of the rotor (cycloid 104) and stator 102 of the magnetic cycloidal gear assembly 100 can be seen by comparing FIG. 5 with FIG. 6. Additionally it should be appreciated that FIGS. 5 and 6 also show corresponding different positions of other components or portions of the magnetic cycloidal gear assembly 100 that also vary in their positions when the cycloid varies in its rotational positioning.

As will be appreciated from the above discussion, movement of the cycloid 104 results from rotation of the input shaft 106 and offset cam 136, which causes different ones of the positive poles 114 and negative poles 116 of the stator 102 to come into proximity with different ones of the negative poles 124 and positive poles 126 of the cycloid 104. Due to the interactions between these pole pairs, slipping motion between the outer cylindrical surface 111 of the cycloid 104 and the inner cylindrical surface 107 of the stator 102 is prevented. Stated in another manner, the magnets in essence prevent "slippage" of the cycloid 104 (serving as the rotor) relative to the stator 102 and thus, due to the magnetic interaction between the pole pairs of the stator 102 and the pole pairs of the cycloid 104, the cycloid rotation couples to the input shaft rotation as the magnets continue to seek their state of lowest potential (relatedly, it can be said that the magnetic forces provide the torque reaction allowing for the gearbox to transmit torque from input to output, as the cycloid would otherwise just spin on its bearing).

Consequently, as governed by the interaction of the magnetic pole pairs on the cycloid 104 and stator 102, rotation of the input shaft 106 and offset cam 136 causes the outer cylindrical surface of the cycloid 104 to "roll along" the inner circular surface 107 of the stator 102 (with those surfaces only being separated by an air gap), in an eccentric manner. The first position of FIG. 5 (and FIG. 4) shows the magnetic cycloidal gear assembly 100 at the start of a 360° revolution of the input shaft 106 (and offset cam 136), when the position of the cycloid 104 is closest to the uppermost portion of the inner cylindrical surface 107 of the stator 102. By comparison, the second position of FIG. 6 is half way through the revolution of the input shaft 106, at 180° from the first position, when the position of the cycloid 104 is closest to the lowermost portion of the inner cylindrical surface 107 of the stator 102.

The particular gear ratio achieved between the input rotation experienced by the input shaft 106 and the output rotation experienced by the output hub 108 depends upon the relative numbers of magnetic pole pairs on the stator 102 and on the cycloid 104. If one assumes, as shown in FIGS. 5 and 6, that the cycloid 104 has one fewer magnetic pole pair than the stator 102, then for every full rotation of the input shaft 106, the cycloid 104 must rotate one full rotation plus and additional amount to make up the difference. Supposing for example that the stator 102 has m+1 pole pairs and the cycloid 104 has m pole pairs, for a point on the cycloid after one full rotation of the input shaft 106, the point will have moved to a position equivalent to −1/m rotations, where the negative sign indicates that the rotation is in the opposite sense to the rotation of the input shaft.

Because the cycloid 104 is supported upon the offset cam 136 and rotates eccentrically within the stator 102, and given the magnetic interactions between the cycloid 104 and stator 102, the amount of air gap (or space) between the stator 102 and the cycloid 104 varies at any given point around the inner cylindrical surface 107 of the stator 102 as the cycloid 104 rotates. Nevertheless, there is always a minimum gap 220 between the stator 102 and the cycloid 104 at a first point and a maximum gap 222 at a second point, and the locations of those points rotate as the cycloid 104 rotates in response to rotation of the input shaft 106 and offset cam 136. The minimum gap 220 particularly always is in line with the high point of the offset cam 136.

For example, as can be seen with reference to FIG. 5 (and FIG. 4), when the cycloid 104 is in the first position, the minimum gap 220 between the stator 102 and the cycloid 104 is at the top (as illustrated in FIGS. 5 and 4) of the stator 102 and the cycloid 104, and then the maximum gap 222 is at the bottom of the stator 102 and the cycloid 104. In contrast, as can be seen with reference to FIG. 6, when the cycloid 104 in the second position, the minimum gap 220 between the stator 102 and the cycloid 104 is at the bottom (as illustrated in FIG. 6) of the stator 102 and the cycloid 104, while the maximum gap 222 is schematically at the top of the stator 102 and the cycloid 104.

FIGS. 5 and 6 additionally show how other components or portions of the magnetic cycloidal gear assembly 100 rotate or otherwise move in conjunction with rotation of the input shaft 106 and offset cam 136 and consequent movement of the cycloid 104. In particular, FIG. 5 shows that, when the cycloid 104 is in the first position, each of the first ends 138 of the respective cam followers 110 is at the respective top of the respective cam follower receiver 146 into which the respective first end is positioned. In contrast, FIG. 6 shows that, when the cycloid 104 is in the second position, each of the first ends 138 of the respective cam followers 110 is at the respective bottom of the respective cam follower receiver 146 into which the respective first end is positioned. Thus, the eccentric rotation of the cam followers 110 within the cam follower receivers 146 that accompanies the eccentric rotation of the cycloid 104 can be appreciated from FIGS. 5 and 6.

As noted above, FIGS. 5 and 6 show the entire magnetic cycloidal gear assembly 100 of the present embodiment and, more particularly, each of FIGS. 5 and 6 (in contrast to FIGS. 2 and 4) also shows schematically the controller 250 for governing actuation of the electromagnets 122 of the stator 102 of the magnetic cycloidal gear assembly 100, along with the associated power/control linkages 252. It should be appreciated that the controller 250 can take any of a variety of forms depending upon the particular embodiment or implementation. For example, the controller 250 can take the form of a microprocessor or computer, including a computerized device that operates in accordance with software. Also for example, the controller 250 can take the form a hardwired control device or a programmable logic device, or multiple such devices, or a drive.

Preferably, the controller 250 is able to output electric power (and particularly current) to the electromagnets 122 by way of the power/control linkages 252 that is sufficient to enable the electromagnets to generate sufficient magnetic fields to allow the magnetic cycloidal gear assembly 100 to transmit rotational power. Depending upon the embodiment, the controller 250 can operate independently or, alternatively, the controller 250 can operate at least partly based upon or in response to commands, control signals, or information received by way of wired or wireless communications from another device, source, or location, including for example a remote controller or from the cloud (not shown). Also, in at least some embodiments, the controller 250 operates directly or indirectly based upon or in response to operator input commands or signals, and/or based upon or in response to sensed information, including for example information regarding the speed or torque of the input shaft 106 or regarding the speed or torque of the output shaft 144 (or structure(s) coupled thereto).

With respect to the power/control linkages 252, the manner in which these are illustrated in FIGS. 5 and 6 is merely intended to be illustrative of the existence of connections between the controller 250 and the electromagnets 122 by which electric power (and particularly current) can be provided to the electromagnets so that magnetic fields are generated by the electromagnets. The exact number and type of structures that are employed as the power/control linkages 252 can vary depending upon the embodiment. In the present example, the power/control linkages 252 include a first linkage 254 and a second linkage 256. Each of the first and second linkages 254 and 256 extends from the controller 250 to the stator 102 and then, within (or alongside) the stator, is coupled to each of the electromagnets 252. (For simplicity of illustration, the portions of the first and second linkages 254 and 256 that are within the interior of or alongside the stator 102 are illustrated by dashed lines, with only some portions of the linkages connected to some of the electromagnets 122 being shown, and other portions being cutaway and not shown.) Although the manner in which the first and second linkages 254 and 256 are shown in FIGS. 5 and 6 indicates that all of the electromagnets 252 are electrically coupled in parallel with one another between the first linkage 254 and the second linkage 256, it should be appreciated that all of the electromagnets can alternatively be coupled in series between the first linkage 254 and the second linkage 256.

Given this embodiment, when electric power (particularly current) is directed from the controller 250 to the electromagnets 122 via the first linkage 254 (or alternatively the second linkage 256), that electric current is directed to and passes through the electromagnets and then returns via the second linkage 256 (or alternatively the first linkage 254). During such operation, all of the electromagnets 122 turn "on" in response to the current conducted therethrough, and all of the electromagnets are simultaneously activated in terms of producing magnetic fields. Correspondingly, when the controller 250 ceases to direct electric power (particularly current) through the first linkage 254 (or alternatively the second linkage 256), then all of the electromagnets 122 are turned "off" and simultaneously deactivated such that no magnetic fields are generated by the stator 102.

In the present embodiment, the controller 250 particularly is configured to cause electric power (and current) to pass through the electromagnets 122 during a normal mode of operation, but to cease directing electric power (and current) flow through the electromagnets during a clutch mode of operation, when clutch functionality is desired. During normal operation when it is desired that the magnetic cycloidal gear assembly 100 generate output rotation at the output hub 108 in response to input rotation of the input shaft 106 in accordance with the gear ratio established by the pole pairs of the stator 102 and cycloid 104, the controller 250 actuates the electromagnets 122 to prevent slippage between the cycloid and the stator as discussed above.

However, when the electromagnets 122 are disabled during the clutch mode of operation (or possibly under other special circumstances when normal operation is not desired), the electromagnets of the stator 102 and permanent magnets 132 of the cycloid 104 will no longer prevent slipping between the cycloid and stator, and the magnetic cycloidal gear assembly (or gearbox) 100 will be able to freewheel. Stated in another manner, the electromagnets 122 and permanent magnets 132 in this circumstance no longer provide a torque reaction, and any torque applied at the input or output will simply cause the rolling element bearing 162 to spin. In such circumstance, the freewheel torque (e.g., as provided at the output shaft 108) will be a function only of the drag caused by the rolling elements, the inertia of the cycloid 104, and any secondary electromagnetic effects caused between the magnets and the unenergized electromagnets 122 (or windings or coils).

Figure 7:
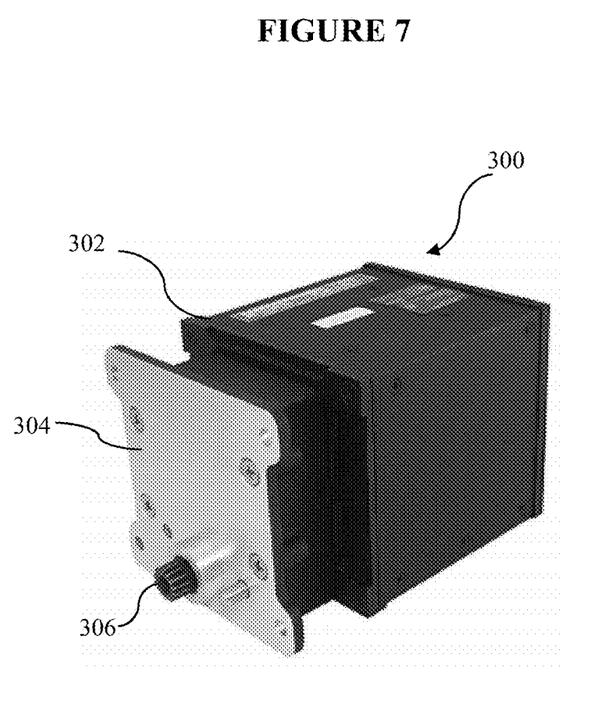
FIG. 7 is a perspective view of a housing for a magnetic cycloidal gear assembly of the present technology such as that described in regard to FIGS. 2, 3, 4, 5, and 6.

It should be recognized that magnetic cycloid gear assemblies of the present technology can be supported or implemented within any of a variety of types of structures depending upon the embodiment, and can be employed in any of a variety of applications. Referring to FIG. 7, in one example embodiment, the magnetic cycloidal gear assembly 100 can be contained within a housing 300. As shown, the housing 300 includes an outer shell 302 that encloses the magnetic cycloidal gear assembly 100. The housing 300 can also include a front cover 304, which can be a removable access panel that, when removed, provides access to the inside of the housing 300 and the magnetic cycloidal gear assembly 100. Additionally, the housing 300 can include one or more additional support and/or mounting structures to support, mount, or otherwise engage with the magnetic cycloidal gear assembly 100.

For example, as shown in FIG. 7, the housing 300 can include a connector 306, which engages and connects at a first end to the output shaft 144 of the output hub 108 and at a second end to another device to transfer rotational power from the magnetic cycloidal gear assembly 100 to the other device, which can be external to the housing. If the input shaft 106 is also driven by a rotational power source external to the housing, a further connector (not shown) can also be provided to couple the input shaft with that rotational power source. Also for example, internally within the housing 300, support and/or mounting structures (not shown) can be provided to support or mount the magnetic cycloidal gear assembly 100 within the housing 300.

It should be appreciated that, in at least some embodiments, the controller 250 and power/control linkages 252 can be positioned with the housing 300 but that, in other embodiments, the controller 250 and/or portions of the power/control linkages 252 can be located outside of the housing even though other portions (e.g., the portions 190 discussed above) are positioned within the housing 300. Also, it should further be appreciated that, although for purposes of the above discussion the magnetic cycloidal gear assembly 100 is considered to be distinct from (and situated within) the housing 300, and is considered to not include the housing or any of the support or mounting structures or components associated therewith, nevertheless the magnetic cycloidal gear assembly can also be understood to include the housing and/or any such support or mounting structures or components.

Figure 8:
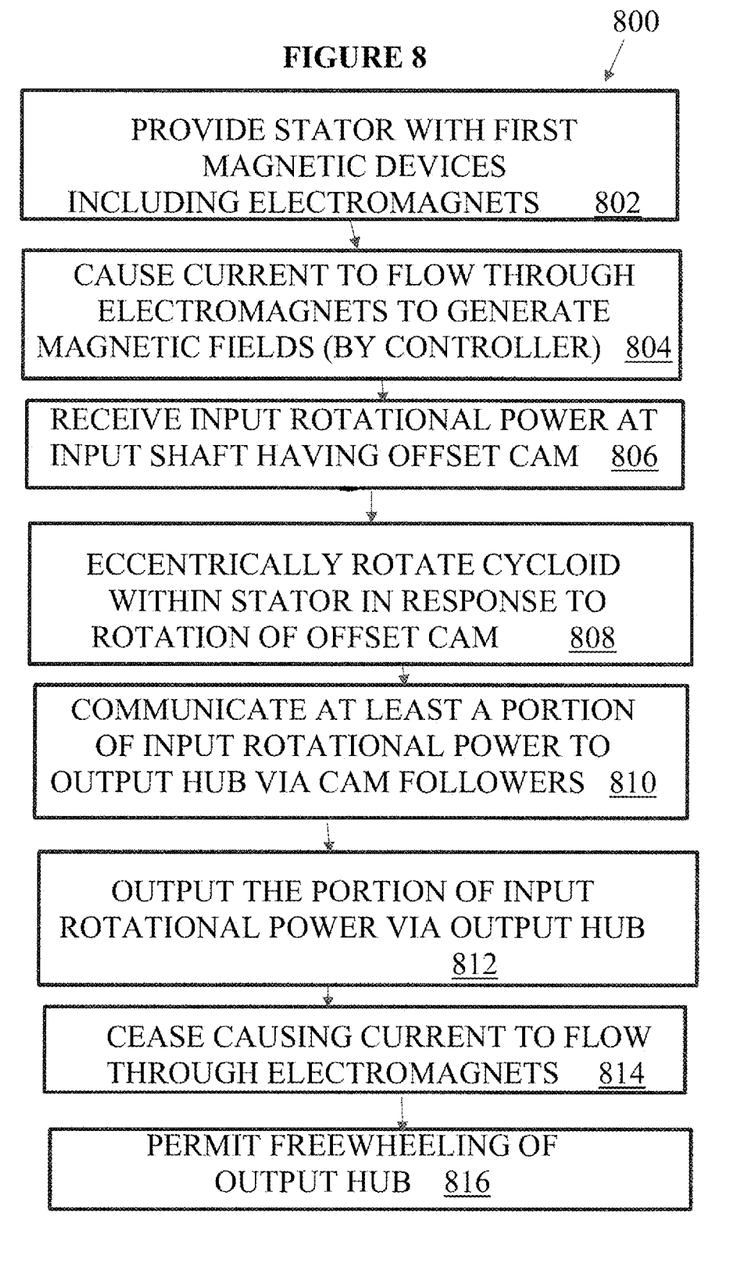
FIG. 8 is a flow chart illustrating example steps of one example method of operation of the magnetic cycloidal gear assembly of FIGS. 2, 3, 4, 5, and 6.

In view of the above discussion it should be appreciated that the magnetic cycloidal gear assembly 100 described in regard to FIGS. 2, 3, 4, 5, and 6 can be operated in several modes of operation by virtue of the controller 250 causing the electromagnets 122 to be powered or unpowered. Referring to FIG. 8, a flow chart 800 is provided to illustrate example steps of one example method of operation of the magnetic cycloidal gear assembly 100 in this regard. Notwithstanding what is shown in FIG. 8, however, it should be understood that the present disclosure is intended to encompass numerous other methods of operation and associated steps of operation for magnetic cycloidal gear assemblies such as the magnetic cycloidal gear assembly 100 or other assemblies or systems, and is not limited to the method shown in FIG. 8.

More particularly with respect to the method of operation illustrated by the flow chart 800, the method begins at a first step 802, at which a stator having magnetic devices including electromagnets is provided, such as the stator 102 with the electromagnets 122. The first step 802 can also be considered an initial step at which the entire structure of the magnetic cycloidal gear assembly 100 is provided or set up for operation. Next, at a second step 804, the controller 250 causes electric power (particularly current) to flow through the electromagnets 122 so as to generate magnetic fields. Further, at a third step 806, rotational power transmission operation of the magnetic cycloidal gear assembly 100 begins insofar as input rotational power is received at the input shaft 106 including the offset cam 136, such that the input shaft and offset cam rotate.

Then, at a fourth step 808, the cycloid 104 is caused to eccentrically rotate within the stator 102 in response to the rotation offset cam 136, consistent with magnetic interactions between the permanent magnets of the cycloid and the electromagnets 122 of the stator 102. Further, at a fifth step 810, at least one portion of the received input rotational power is communicated from the cycloid 104 to the output hub 108. In at least the present embodiment, the communication of this rotational power occurs due to interactions of the cam followers 110 with the cam follower receivers 146 of the output hub 108. Additionally, at a sixth step 812, the at least one portion of the input rotational power is output via the output hub (e.g., for receipt by a load or receiving device).

All of the steps 804, 806, 808, 810, and 812 can be considered to occur at a first time (or during a first time period) during which the magnetic cycloidal gear assembly 100 is operating in a normal mode of operation of the magnetic cycloidal gear assembly 100. During such normal operation, the magnetic cycloidal gear assembly 100 operates to transmit rotational power between the input shaft 106 and the output hub 108, with the rotational power being modified in terms of the rotational speed and torque in a manner consistent with the gear ratio of the magnetic cycloid gear assembly. However, as described above, in a clutch mode or other mode of operation of the magnetic cycloidal gear assembly, it can be desired that the output hub 108 be decoupled from the input shaft 106 so that the output hub experiences freewheeling.

In this regard, the method of FIG. 8 additionally includes a seventh step 814, at which the controller 250 ceases causing the electric power (and electric current) to be provided to the electromagnets 122 of the stator 102, such that the electric power (and current) ceases to flow through those electromagnets. Upon this occurring, then at an eight step 816, the output hub 816 becomes rotationally decoupled from the input shaft 106 and freewheeling of the output hub is permitted. Although not shown in FIG. 8, it should be appreciated that the steps of the flow chart 800 can be repeated such that the magnetic cycloidal gear assembly 100 repeatedly switches between operation in the normal mode and operating in a mode where freewheeling is possible. For example, upon completion of the eight step 816, the method can return to the step 804 at which electric power (and current) is again caused to flow through the electromagnets during a return to the normal mode of operation.

Notwithstanding the above description, the present disclosure is intended to encompass numerous alternate embodiments. For example, although the electromagnets can be located on the stator 102 as shown in FIGS. 2, 4, 5, and 6, electromagnets can alternatively be mounted on the cycloid 104 (or rotor), or be mounted on each of the stator and the cycloid. Also, although FIGS. 2 through 6 concern the application of electromagnets and electromagnetic control to a particular example topology of a magnetic cycloidal gear assembly, the present disclosure is intended to encompass numerous other typologies including not only other typologies of cycloidal gears but also other topologies such as ones involving coaxial magnetic gears, magnetic spur gears, and other types of gears and gear arrangements.

Additionally, notwithstanding the above description, the controller 250 and power/control linkages 252 can take a variety of other forms depending upon the embodiment or circumstance. For example, in some alternate embodiments, the power/control linkages include a plurality of different linkages that are respectively coupled to different respective ones of the electromagnets 122. In such embodiments, all of the electromagnets 122 need not be powered simultaneously. Rather, the controller 250 can actuate the different ones of the electromagnets 122 at respectively different times or in respectively different manners. Further for example, in some such embodiments, different respective actuating electrical currents can be applied by the controller 250 respectively to different ones of the electromagnets 122 so that different respective magnetic fields are generated by the different electromagnets (e.g., magnetic fields with different magnitudes or occurring at different times). Also, although it is envisioned that the controller 250 will provide direct current (DC) power to the electromagnets 122 in the magnetic cycloidal gear assembly 100 of FIGS. 2 through 6 described above, in other embodiments other forms of power (or current or voltage) can be provided to one or more of the electromagnets, such as alternating current (AC) power.

The present disclosure further envisions and encompasses alternate embodiments in which the operation of electromagnets as controlled by a controller (e.g., via power/control linkages) occurs in any of a variety of different or additional manners. In at least some such alternate embodiments, control of the electromagnets (or windings or coils) permits improved performance of the magnetic cycloidal gear assembly (or gearbox) by comparison with magnetic cycloidal gear assemblies (or gearboxes) that only employ permanent magnets but not electromagnets. Also, in at least some such alternate embodiments, the electromagnets (or windings or coils) can be controlled in any of a variety of modulated manners to achieve any of a variety of goals.

For example, in one such alternate embodiment, the controller can operate to modulate the electromagnets on the stator (e.g., the stator windings or coils) to "lead" the cycloid, so as to improve the output speed of the system at a given input torque over what a motor alone would be able to achieve. Also for example, in an additional such alternate embodiment, the controller can operate to modulate the electromagnets on the stator (e.g., the stator windings or coils) in a manner such that the gearbox operates at a different gear ratio than the inherent gear ratio, potentially optimizing for motor power or some other parameter. Further for example, in another such alternate embodiment, the controller can operate to modulate the electromagnets on the stator (e.g., the stator windings or coils) in a manner that reduces or minimizes the forces on the input shaft (e.g., magnetic and centripetal forces), so as to reduce the burden on the shaft and bearings, and potentially reduce the size and weight of the counterweight/counterbalance.

Additionally for example, in a further such alternate embodiment, the controller can operate to modulate the electromagnets on the stator (e.g., the stator windings or coils) in a manner that is independent of the motor to provide small or high frequency position adjustments. Also for example, in an additional such alternate embodiment, the controller can operate to modulate the electromagnets on the stator (e.g., the stator windings or coils) with respect to torque to improve the stiffness of the gearbox. Although each of these alternate embodiments involving various types of modulation particularly involves modulation of the electromagnets on the stator (or the power or currents delivered thereto), the present disclosure also is intended to encompass embodiments that involve modulation of electromagnets on a cycloid or rotor, instead of (or in addition to) modulation of electromagnets on a stator.

One or more of the embodiments encompassed herein can be advantageous in any of a variety of respects. For example, in at least some embodiments, the benefits of the technology include the ability to achieve very high gear ratios in a single stage, true zero-backlash operation, as well as reduced wear, reduced noise and improved reliability and life due to the lack of mechanically meshing gear teeth. Also for example, with respect to at least some embodiments encompassed herein, because the magnetic cycloidal gear assemblies (or gearboxes) employ electromagnets, the magnetic cycloidal gear assemblies can operate both as conventional magnetic gearboxes when powered (e.g., during a normal mode of operation), and also can "disengage" to allow freewheeling of the output when necessary (e.g., during a clutch mode of operation). Further for example, with respect to at least some embodiments encompassed herein, any of a variety of different types of control over the actuation and deactivation (and/or modulation) of one or more of the electromagnets of a magnetic cycloidal gear assembly can be performed in order to achieve any of a variety of different types of operation. Additionally, the present disclosure is not limited to the embodiments employing magnetic cycloidal arrangements but rather encompasses embodiments having other structures and arrangements as well.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. An electromagnetically-controlled magnetic cycloidal gear assembly comprising:
   a stator that is fixed and concentric with respect to a primary axis of the magnetic cycloidal gear assembly, and that includes a plurality of first magnetic devices;
   an input shaft that is configured to rotate about the primary axis and that includes an offset cam that is offset with respect to the primary axis;
   a cycloid mounted at least indirectly upon the offset cam and configured to rotate both relative to the offset cam and also within the stator, wherein the cycloid is eccentric with respect to the primary axis and includes a plurality of second magnetic devices;
   an output hub that is concentric with the primary axis and includes a plurality of cam follower receivers; and
   a plurality of cam followers, each cam follower having a respective first end and a respective second end, wherein the respective first end of each cam follower is received within a respective one of the cam follower receivers and the respective second end of each cam follower is coupled to the cycloid at a respective location on the cycloid,
   wherein either each of the first magnetic devices or each of the second magnetic devices includes a respective electromagnet configured to produce a respective magnetic field in accordance with a respective current passing therethrough.

2. The electromagnetically-controlled magnetic cycloidal gear assembly of claim 1, wherein each of the first magnetic devices of the stator respectively includes the respective electromagnet, and each of the second magnetic devices of the cycloid includes a respective permanent magnet.

3. The electromagnetically-controlled magnetic cycloidal gear assembly of claim 2, wherein the stator includes a first back-iron cylinder having a plurality of first teeth, and wherein each of the electromagnets included by the first magnetic devices is mounted between a respective first pair of the first teeth.

4. The electromagnetically-controlled magnetic cycloidal gear assembly of claim 3, wherein the cycloid is rotatably mounted on the offset cam by way of a rolling element bearing, wherein the cycloid includes a second back-iron cylinder having a plurality of second teeth, and wherein each of the permanent magnets included by the second magnetic devices is mounted between a respective second pair of the second teeth.

5. The electromagnetically-controlled magnetic cycloidal gear assembly of claim 4, wherein the electromagnets and first teeth form a plurality of first pole pairs, and wherein the permanent magnets and second teeth form a plurality of second pole pairs.

6. The electromagnetically-controlled magnetic cycloidal gear assembly of claim 3, further comprising an adjustable counterweight attached to the input shaft.

7. The electromagnetically-controlled magnetic cycloidal gear assembly of claim 6, wherein the cycloid includes a plurality of cam follower retainers, and wherein each of the cam followers is coupled to the cycloid by way of a respective one of the cam follower retainers.

8. The electromagnetically-controlled magnetic cycloidal gear assembly of claim 7, further comprising a housing including an outer shell, a front cover that is removable to provide access to an inside of the housing, and a connector that connects at a first end to the output hub.

9. The electromagnetically-controlled magnetic cycloidal gear assembly of claim 1, further comprising a controller and one or more links by which the controller is coupled to the electromagnets, the controller configured to govern the currents passing through the electromagnets so as to influence magnetic fields generated by the electromagnets.

10. The electromagnetically-controlled magnetic cycloidal gear assembly of claim 9, wherein the controller causes, at a first time during a first mode of operation, the currents to pass through the electromagnets so as to generate the magnetic fields and also causes, at a second time during a second mode of operation, a cessation of the currents so that freewheeling can occur.

11. An electromagnetically-controlled magnetic cycloidal gear assembly comprising:
    a stator that is fixed and concentric with respect to a primary axis of the magnetic cycloidal gear assembly, and that includes a plurality of first magnetic devices, wherein each of the first magnetic devices includes a respective electromagnet;
    an input shaft that is configured to rotate about the primary axis and that includes an offset cam that is offset with respect to the primary axis;
    a cycloid mounted at least indirectly upon the offset cam and configured to rotate both relative to the offset cam and also within the stator, wherein the cycloid is eccentric with respect to the primary axis and includes a plurality of second magnetic devices, and wherein each of the second magnetic devices includes a respective permanent magnet;
    an output hub that is concentric with the primary axis and includes a plurality of cam follower receivers, wherein the output hub is at least indirectly rotationally coupled to the cycloid by way of a plurality of cam followers that are coupled to the cycloid and that respectively interface the cam follower receivers;
    a controller coupled to each of the electromagnets by way of one or more linkages, wherein the controller is configured to govern at least one electric current that is passed through at least one of the electromagnets so as to produce a magnetic field.

12. The electromagnetically-controlled magnetic cycloidal gear assembly of claim 11, wherein the controller is coupled to each of the electromagnets by way of the one or more linkages in a manner such that the at least one electric current is passed through all of the electromagnets and such that all of the electromagnets are powered simultaneously.

13. The electromagnetically-controlled magnetic cycloidal gear assembly of claim 11, wherein the controller is configured to cause the at least one electric current to pass through the at least one electromagnet at a first time during a first mode of operation, and configured to cause the at least one electric circuit to cease passing through the at least one electromagnet at a second time during a second mode of operation.

14. The electromagnetically-controlled magnetic cycloidal gear assembly of claim 11, wherein the controller includes at least one of a microprocessor or a drive.

15. The electromagnetically-controlled magnetic cycloidal gear assembly of claim 11, wherein the at least one electric current that is passed through the at least one of the electromagnets includes a plurality of electric currents that are respectively passed through the respective electromagnets, and wherein the controller is configured to modulate at least one of the electric currents of the plurality of electric currents.

16. The electromagnetically-controlled magnetic cycloidal gear assembly of claim 11, wherein the stator includes a first back-iron cylinder having a plurality of first teeth, and wherein each of the electromagnets included by the first magnetic devices is mounted between a respective first pair of the first teeth.

17. The electromagnetically-controlled magnetic cycloidal gear assembly of claim 16, wherein the cycloid is rotatably mounted on the offset cam by way of a rolling element bearing, wherein the cycloid includes a second back-iron cylinder having a plurality of second teeth, and wherein each of the permanent magnets included by the second magnetic devices is mounted between a respective second pair of the second teeth.

18. A method of operating a electromagnetically-controlled magnetic cycloidal gear assembly, the method comprising:
providing a stator that is fixed and concentric with respect to a primary axis of the magnetic cycloidal gear assembly, and that includes a plurality of first magnetic devices, wherein each of the first magnetic devices includes a respective electromagnet;
causing, at least indirectly by way of a controller, at least one current to flow through the respective electromagnets of the first magnetic devices so as to generate a magnetic field;
receiving input rotational power at an input shaft having an offset cam about the primary axis, wherein the offset cam is offset with respect to the primary axis;
in response to the receiving of the input rotational power, eccentrically rotating a cycloid that is mounted at least indirectly upon the offset cam within the stator, wherein the cycloid is eccentric with respect to the primary axis and includes a plurality of second magnetic devices, a and wherein each of the second magnetic devices includes a respective permanent magnet,
wherein the cycloid eccentrically rotates at least in part due to interactions between the first magnetic devices and the second magnetic devices;
communicating at least one first portion of the input rotational power from the cycloid to an output hub that is concentric with the primary axis and includes a plurality of cam follower receivers, by way of a plurality of cam followers that are coupled to the cycloid and that interface the cam follower receivers; and
outputting the at least one first portion of the input rotational power as output rotational power from the output hub.

19. The method of operating the electromagnetically-controlled magnetic cycloidal gear assembly of claim 18, wherein the causing occurs during a first mode of operation.

20. The method of operating the electromagnetically-controlled magnetic cycloidal gear assembly of claim 19, further comprising: causing, at least indirectly by way of the controller, the at least one current to cease flowing through the respective electromagnets of the first magnetic devices, so as to permit freewheeling of the output hub during a second mode of operation.

\* \* \* \* \*